Nov. 25, 1969    C. H. WILLSEY    3,480,056
EGG BREAKING MACHINE
Filed March 21, 1967    7 Sheets-Sheet 1
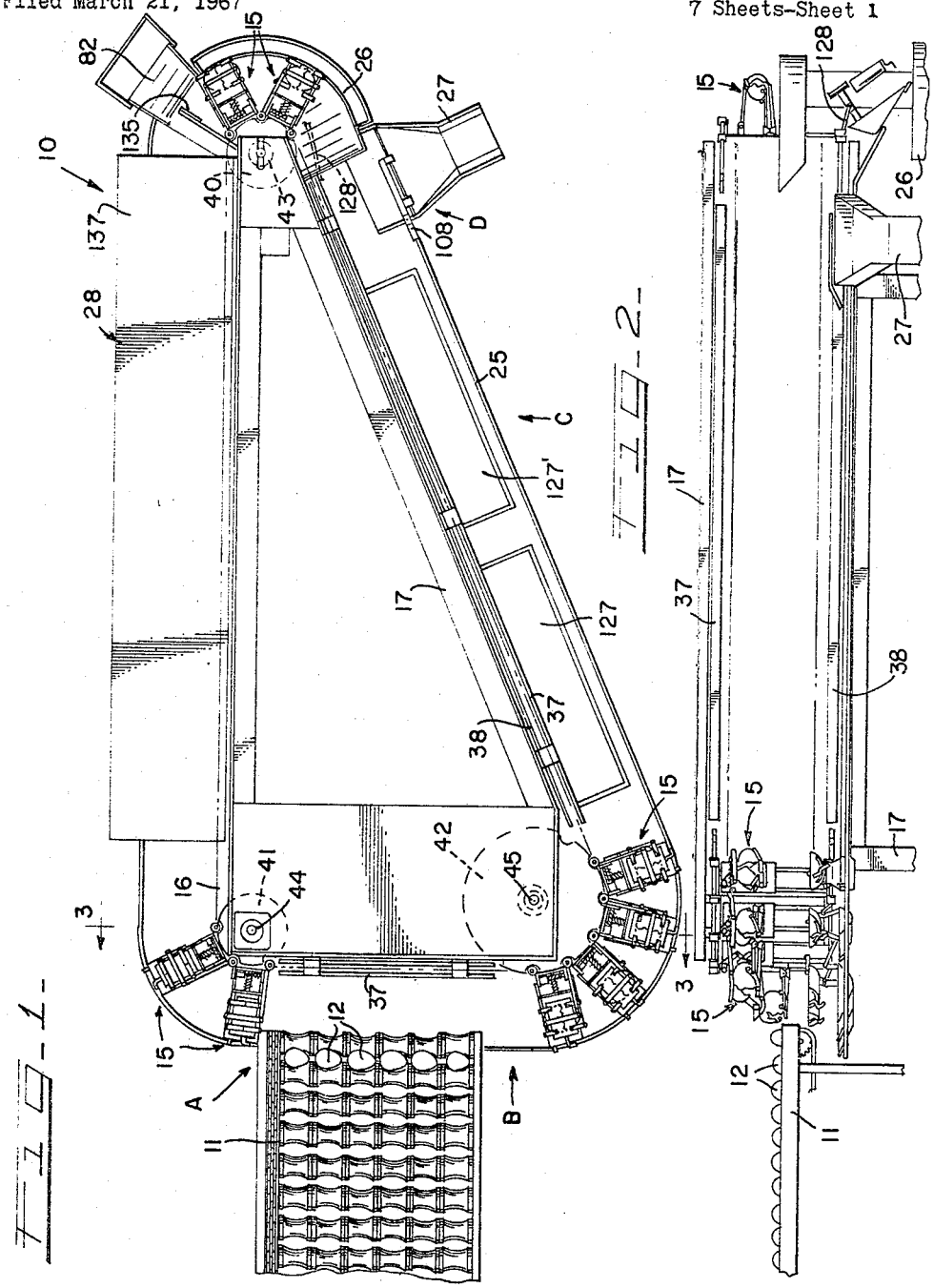
INVENTOR
CHARLES H. WILLSE
BY Griest, Lockwood, Greenawalt
& Dewey
ATT'YS.

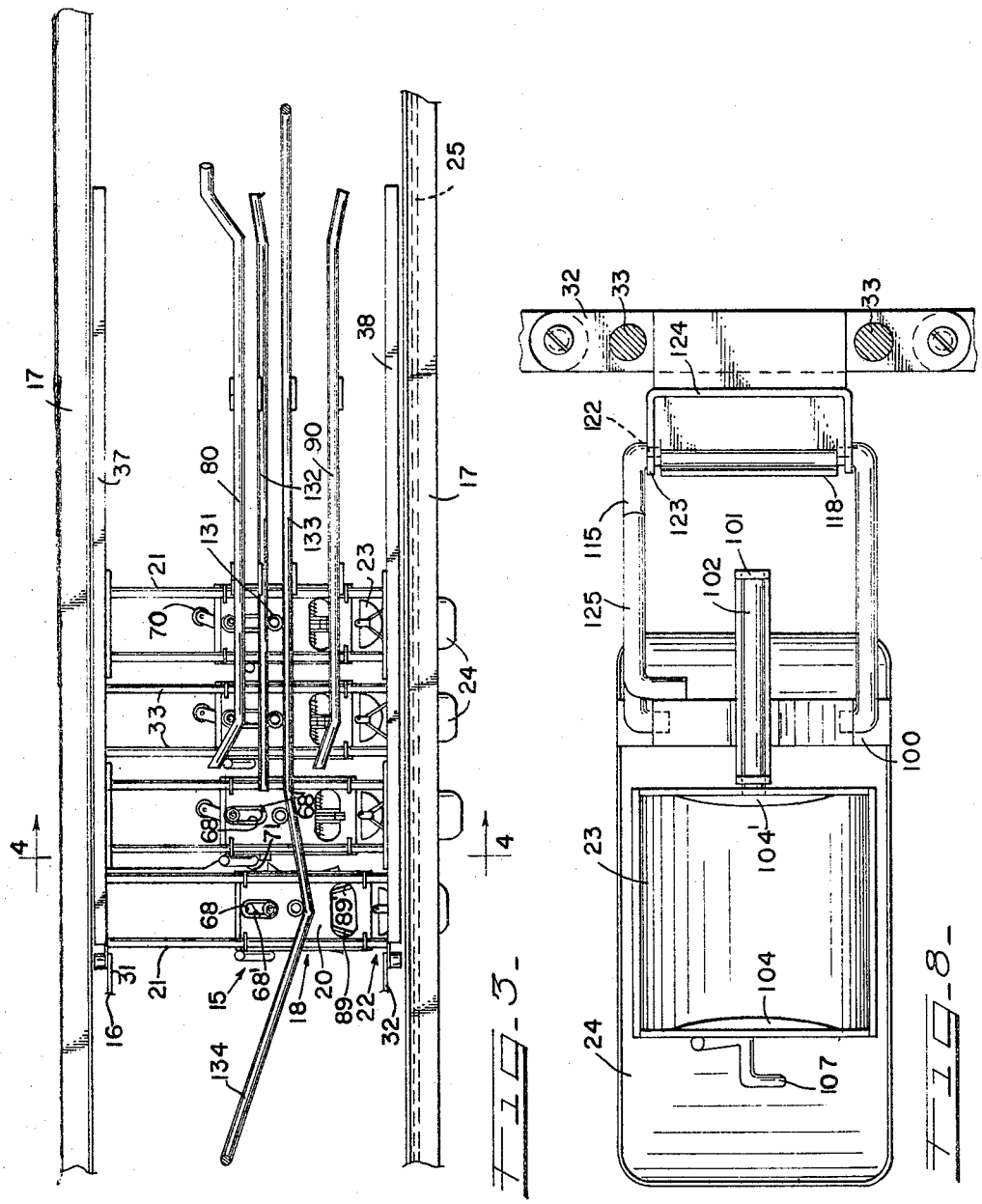

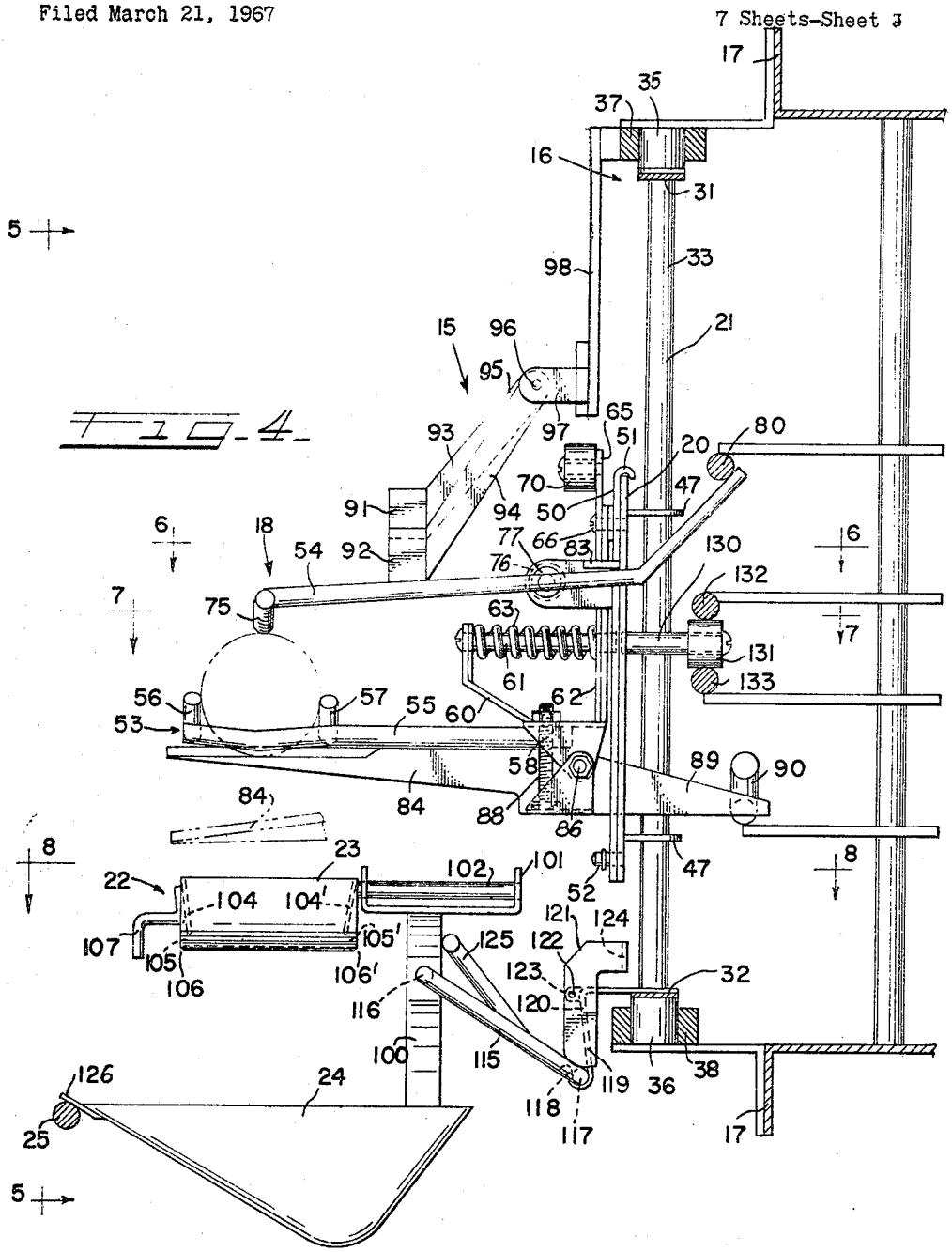

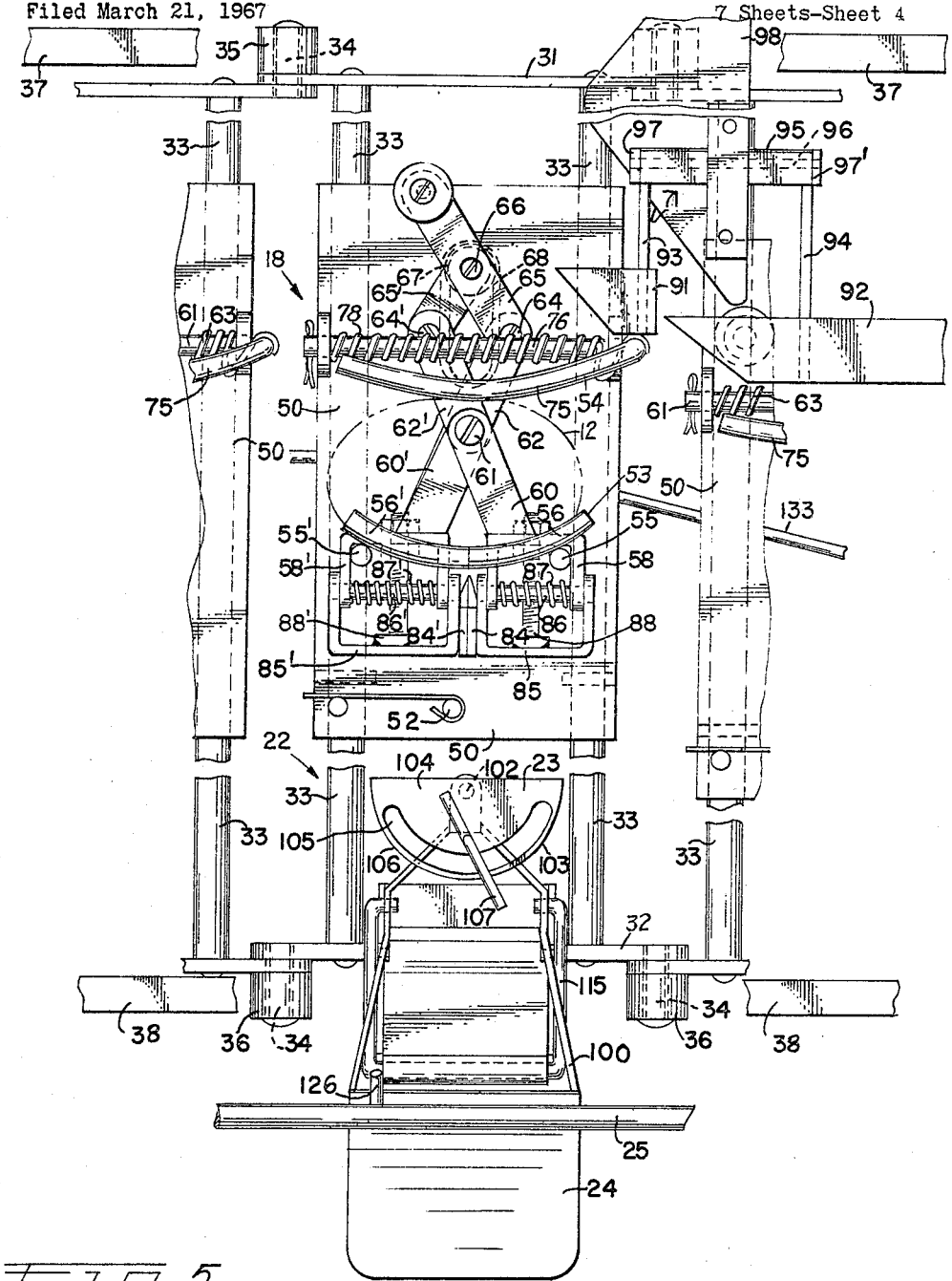

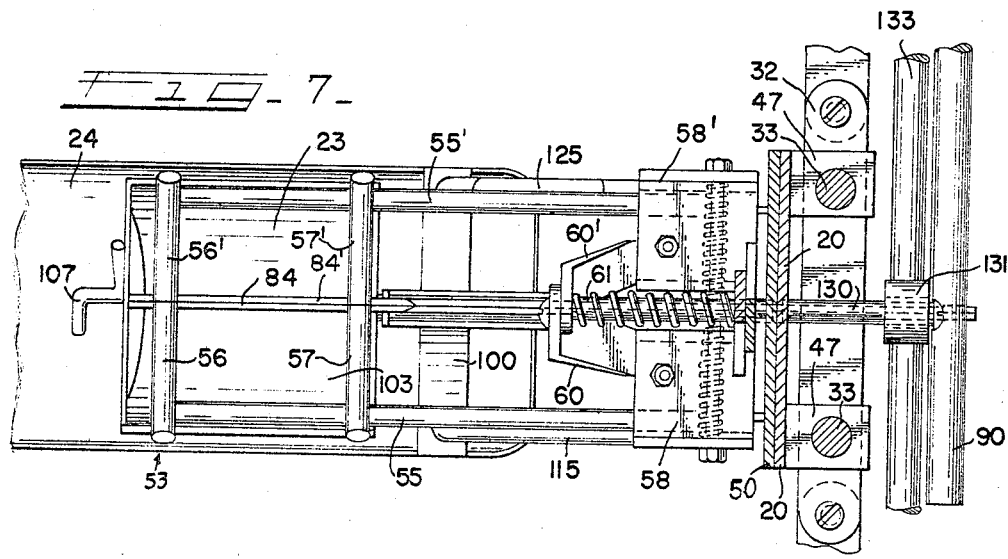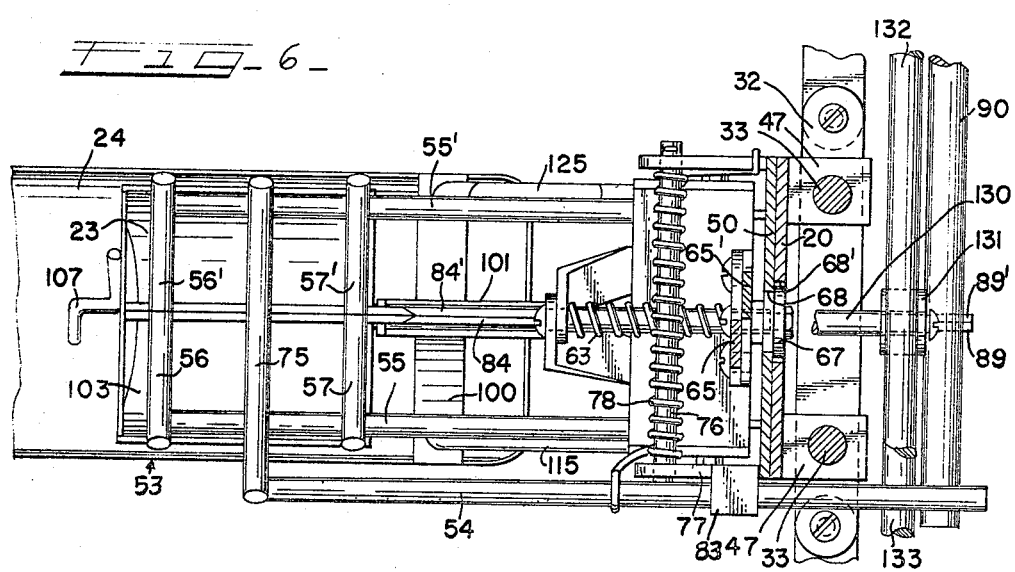

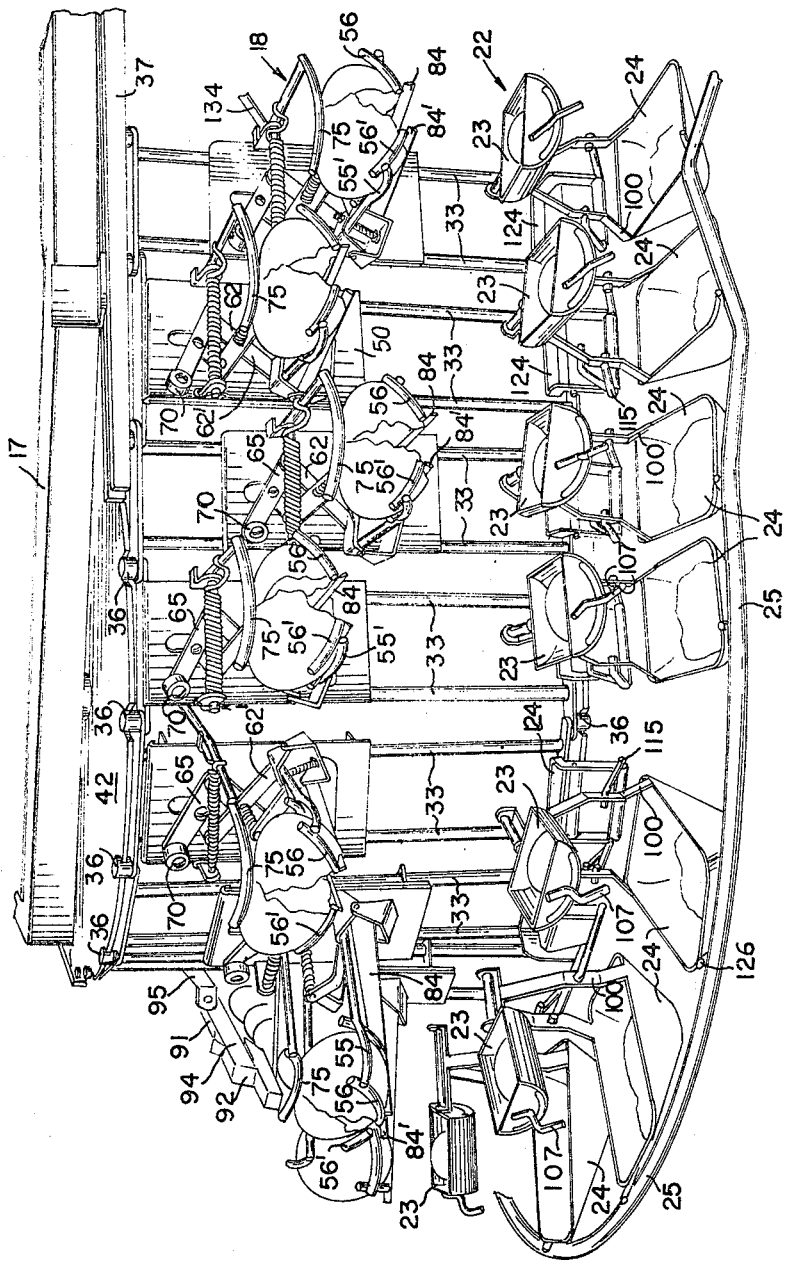

Nov. 25, 1969  C. H. WILLSEY  3,480,056
EGG BREAKING MACHINE

Filed March 21, 1967  7 Sheets-Sheet 7

INVENTOR
CHARLES H. WILLSEY
BY
ATT'YS.

United States Patent Office 3,480,056
Patented Nov. 25, 1969

3,480,056
EGG BREAKING MACHINE
Charles H. Willsey, 1717 E. 37th St.,
Topeka, Kans. 66605
Filed Mar. 21, 1967, Ser. No. 624,786
Int. Cl. A23b 5/00; A23l 1/32
U.S. Cl. 146—2
20 Claims

ABSTRACT OF THE DISCLOSURE

An apparatus for cracking shell eggs and separating the yolks from the albumen which is characterized by a series of cracking and separating assemblies having egg gripping members with associated cracking knives and cooperating contents separating devices which are carried on an endless traveling conveyor in a path along which there are mounted cam mechanisms for operating the cracking and separating devices, collecting receptacles into which the yolk and albumen are dumped, and washing apparatus for cleaning the cracking and separating devices.

---

This invention relates to egg processing equipment and is more particularly concerned with improvements in a machine having mechanism for cracking or breaking successive eggs, separating the broken shell portions so as to deliver the contents therefrom and associated mechanism for separating the yolks from the whites.

Machines have heretofore been developed and operated commercially for cracking eggs, separating the broken or cracked shells into two portions, and dumping the contents from the separated shell portions into associated separating mechanism which separates the white from the yolk and delivers the separated egg portions for accumulation into separate receptacles. Machines of this character have been constructed, for example, in accordance with the disclosures in Patent No. 2,760,536, dated Aug. 28, 1956 and Patent No. 2,966,184, dated Dec. 27, 1960. These machines have been found to operate successfully in the processing of eggs on a commercial scale with the product being frozen or dried for marketing. While these prior machines have operated in a highly successful manner, it has been felt that an improved mechanism could be devised which would result in still more efficient operation at higher speeds, with a greater percentage of separation of the yolk from the white and less yolk breakage, and with improved washing and sterilizing facilities which would further reduce the risk of contamination of the product, and the general object of the present invention is to provide an improved machine which will operate to accomplish these results.

More particularly, the present invention resides in improvements in a machine for processing shell eggs wherein the eggs are delivered to cracking assemblies carried on a conveyor mounted for travel in an endless path, with the assemblies having egg supporting, gripping and breaking devices and contents separating devices associated therewith which are automatically operated while the assemblies are advanced to crack the eggs, dump the contents into the separating devices and separate the yolks from the albumen for deposit in receptacles positioned along the path of travel of the assemblies and wherein provision is made for increasing the amount of albumen which is dumped or drained from the shell portions, for reducing the distance the yolks travel when dumped from the shell into the separating devices, for obtaining maximum separation of the whites from the yolks and for thoroughly cleaning both the gripping and cracking devices and the separating devices of each successive cracking assembly after the cracking and separating operations are completed.

An object of the invention is to provide in an egg cracking machine an improved cracking head which is carried on a traveling conveyor operating continuously in an endless path wherein the cracking head includes an egg gripping and cracking assembly disposed above a contents separating device and mounted for reciprocating movement in a vertical path so as to enable the distance to be varied which the egg contents is required to fall when the shell is broken and opened and to permit rapid reciprocation of the assembly while the albumen is draining from the shell thereby facilitating the removal of the albumen from the shell.

Another object of the invention is to provide a cracking and separating assembly adapted to be mounted on a horizontally disposed conveyor for travel in an endless path which comprises an egg gripping and breaking mechanism disposed above a contents separating mechanism and mounted on the conveyor for reciprocation in a vertical path wherein the egg is initially supported in a cradle formation on the outer ends of a pair of generally parallel arm members extending outboard of the supporting conveyor and held thereon by a single clamping arm member while the shell is cracked by associated cracking members and opened by separation of the parallel arm members for dumping of the contents into the separating mechanism.

A further object of the invention is to provide a cracking machine for processing eggs wherein a series of cracking heads are carried on a conveyor for travel in an endless path with each cracking head having an egg gripping and breaking mechanism disposed above a separating mechanism which includes a tray-like bottom receptacle for receiving the albumen when the egg is broken and the shell portions separated to dump the contents and a yolk cup pivotally mounted above the same which is of improved construction so as to effect maximum separation of the albumen from the yolk of an egg dumped therein and to facilitate subsequent discharge of the yolk into a collecting receptacle.

A still further object of the invention is to provide an egg cracking machine which comprises a series of cracking and separating assemblies mounted in closely spaced relation on an endless traveling conveyor and mechanism along the path of the conveyor for operating first the cracking mechanism and then the separating mechanism of each assembly so as to automatically break an egg, dump the contents, separate the white from the yolk, and deposit the same in separate receptacles and for thereafter disposing of the empty shell portions and washing or cleasing the cracking mechanism and the separating mechanism of each assembly.

These and other objects and advantages of the invention will be apparent from a consideration of the egg processing machine which is shown by way of illustration in the accompanying drawings wherein:

FIGURE 1 is a plan view of an egg breaking and separating machine embodying the principal features of the invention with portions thereof broken away or omitted;

FIGURE 2 is an elevation of one side of the machine, with portions broken away or omitted;

FIGURE 3 is a cross section taken on the line 3—3 of FIGURE 1, to a larger scale and with portions broken away;

FIGURE 4 is a cross section taken on the line 4—4 of FIGURE 3, to an enlarged scale;

FIGURE 5 is a view taken on the line 5—5 of FIGURE 4, showing the mechanism of FIGURE 4 in elevation;

FIGURE 6 is a cross section taken on the line 6—6 of FIGURE 4, to an enlarged scale;

FIGURE 7 is a cross section taken on the line 7—7 of FIGURE 4, to an enlarged scale;

FIGURE 8 is a cross section taken on the line 8—8 of FIGURE 4, to an enlarged scale;

FIGURE 9 is a perspective view, with portions omitted or broken away, the view showing a portion of the machine beyond the breaking and dumping station;

Figures 10, 11:
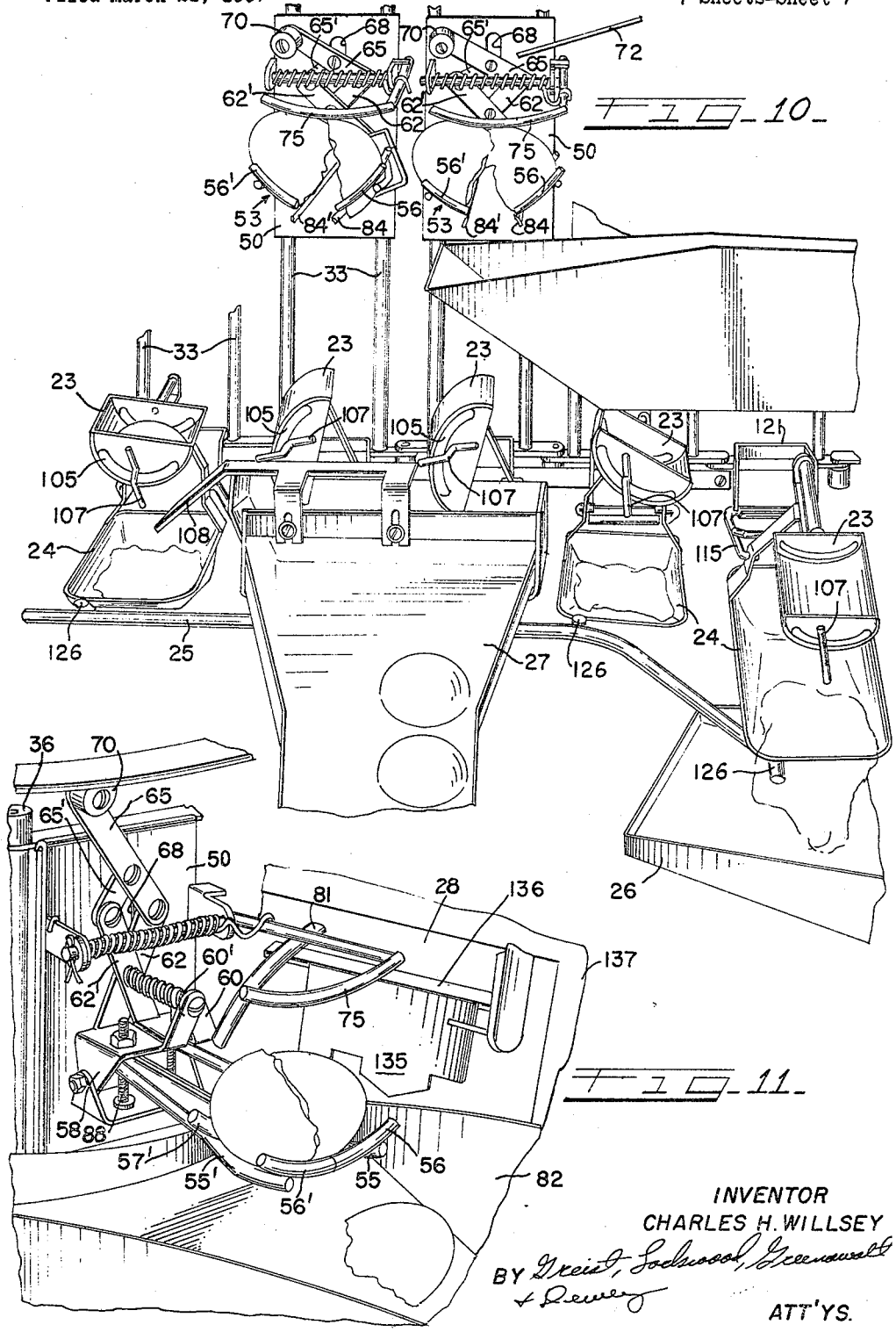
FIGURE 10 is a fragmentary perspective view showing a portion of the machine at the point where the yolk and albumen are separately discharged for deposit in collecting receptacles.
FIGURE 11 is a fragmentary perspective view at the apex end of the machine showing the arrangement for discharging the empty shell portions.

Referring particularly to FIGURES 1 and 2 of the drawings, the general arrangement of the several mechanisms which are incorporated in the machine 10 and the manner in which they cooperate in breaking eggs and separating the whites from the yolks will be described briefly, followed by a detail description of the structure and operation of the separate mechanisms.

The breaking or cracking machine 10 is adapted to be supplied with shell eggs, preferably, from an egg washing or cleaning apparatus having an egg supporting endless conveyor 11 with the discharge end thereof positioned to deliver successive rows of a predetermined number of eggs 12 directly to the infeed end of the cracking and separating machine 10, as shown in FIGURE 1. Successive rows of eggs 12 are delivered by the intermittently advancing conveyor 11, which is operating in a horizontal plane, directly to a series of continuously advancing breaking heads 15, having egg cracking and contents separating assemblies which are mounted in closely spaced relation on an endless traveling conveyor 16. The conveyor 16 is disposed in a horizontal plane and mounted on an upright supporting frame 17 for travel in a generally triangular path with the eggs being fed to the breaking heads 15 at the end forming the base of the triangle, separation of the whites and yolks and inspection thereof being accomplished along the front side forming the hypotenuse of the triangle, and washing and sterilizing of the cracking and separating mechanisms on the heads being provided for along the remaining or rear side of the machine. The breaking heads 15 each comprise an egg gripping and cracking mechanism 18 (FIGURES 3 to 8) mounted on a vertically disposed plate 20 which is supported on a rectangular link forming frame 21 on the conveyor 16 for limited vertical movement above an associated egg contents separating mechanism 22 which is carried for outboard swinging movement at the bottom of the link frame 21 and which receives the egg contents after the egg is cracked and opened by the cracking assembly 18 and is operative thereafter to separate the white from the yolk, provided the egg contents is found by the operator to be suitable for separation, as the assembly is carried by the conveyor 16 in a path past an inspection station and above collecting pans or trays into which the separated white and yolk is dumped. The separating mechanisms 22 comprise a yolk receiving bowl 23 and a triangular shaped white or albumen receiving pan 24 which is mounted beneath the bowl 23 and normally supported on a cam rail 25. The cracking mechanism 18 and the separating mechanism 22 are operated automatically to grip the eggs, crack the shell, open the shell halves and dump the contents into the bowl 23 and the pan 24 with the latter being manipulated as the assembly 22 is advanced by the conveyor 16 so as to separate the white or albumen from the yolk and thereafter to deliver the albumen and the yolk separately by dumping the same in the collecting tray 26 (FIGURES 1 and 2) and the chute 27 for removal from the machine. The separating mechanism 22 is arranged so that the operator may dump the entire contents into a waste chute or container (not shown) when a spoiled or inedible egg has been delivered to the same or into a whole egg chute or container (not shown) when the yolk is broken. Provision is made for disposal of the shell halves as the assemblies 15 are carried about the apex forming end of the triangular frame 17 and washing mechanism, indicated at 28, is arranged along the rear side of the conveyor 16 for cleaning and sterilizing both the cracking mechanism 18 and the separating mechanism 22.

The conveyor 11 which delivers eggs to the breaking machine 10 is arranged for movement of its egg carrying upper run in a generally horizontal plane slightly above the path of travel of the egg supporting portions of the cracking mechanisms 18 while the latter are at an infeed station A (FIGURE 1), at the end of the breaking machine so that each line or row of eggs 12 is delivered over the end of the conveyor 11 and received in the cracking mechanisms 18 on the conveyor 16.

The cracking and separating heads or assemblies 15 to which the eggs are fed by the conveyor 11 are carried in a triangular path about the upper portion of the upright supporting frame 17 on the conveyor 16 with each assembly 15 mounted on a rectangular frame 21 constituting a link in the conveyor 16. Each rectangular frame 21 is disposed in a vertical plane with top and bottom link plates 31 and 32 (FIGURES 4 and 5) secured in vertically spaced relation at the top and bottom of a pair of vertically disposed, spaced, parallel rods 33. Each of the plates 31 and 32 is connected to the corresponding plates of the adjoining link frames 21 by pivot pins 34 which are extended at the top and bottom and have guide rollers 35 and 36 mounted thereon. The top guide rollers 35 ride in a guide channel 37 supported by suitable brackets at the top of the frame 17. In like manner, the bottom guide rollers 36 ride in a guide channel 38 which is supported by suitable brackets extending from the frame 17. The conveyor 16 travels about the sprockets 40, 41 and 42 which are mounted on vertically disposed shafts 43, 44 and 45, with the shafts journaled in suitable bearings and in vertically disposed relation in the frame structure 17 and with one of the shafts being connected to a suitable power drive mechanism (not shown).

Each cracking mechanism 18 (FIGURES 4 to 7) is detachably mounted on a vertically disposed, rectangular mounting plate 20 having apertured lugs 47 at the four corners thereof which extend normal to the plane of the plate and are aligned vertically in pairs so as to mount the plate 20 in sliding relation on the vertical rods 33 which extend between the top and bottom link plates 31 and 32. The cracking mechanism 18 is carried on a back plate 50 of approximately the same size and shape as the mounting plate 20. The back plate 50 has a hook formation 51 at the upper end which is adapted to hook over the top edge of the mounting plate 20 with the back plate 50 extending downwardly and separably connected at the bottom to the mounting plate 20 by a suitable manually operable latch 52 so that the entire mechanism 18 may be readily removed for repair and/or replacement when desired. The egg gripping and cracking mechanism includes a bottom egg supporting cradle assembly 53 and a hold-down arm 54 mounted above the same with both extending outward of the back plate 50 and constituting an egg gripping and holding device. The egg supporting cradle 53 comprises a pair of spaced parallel arms 55 and 55' each having mounted on the outer ends thereof a pair of curved bar members 56, 57 and 56', 57'. The curved bar cradle members of each pair thereof are spaced axially on the arms and in the closed position of the arms 55 and 55', the bar members 56, 56' and 57, 57' are aligned so as to form, as shown in FIGURE 5, a cradle for supporting the eggs, with the curvature thereof conforming generally to the curvature of an egg when arranged thereon with the long axis extending generally in the same direction as the cradle members 56, 56' and 57, 57'. The cradle arms 55 and 55' are secured at the ends thereof opposite the cradle formation to a pair of downwardly opening, U-shaped brackets 58 and 58'. The brackets 58 and 58' are attached at their outer edges to the lower ends of link forming members 60 and 60' depending in angled relation from the outer end of a pivot pin 61 and are connected at their inboard edges to the lower ends of a pair of link bars 62 and 62'. The link bars 62 and 62' are pivotally mounted intermediate their ends so that they may be swung apart on the pivot pin 61 which extends from the back plate 50 and which carries a torsion spring 63 connected to the forward links 60 and 60', the torsion spring normally holding the arms 55 and 55' and the cradle members thereon in closed position. The link bars 62 and 62' are pivotally connected at 64 and 64' to the bottom ends of link bars 65 and 65' which extend upwardly and are connected by pivot pin 66. The pivot pin 66 has a cam roller forming end portion 67 which is in two sections of different diameter and which is slidably mounted for limited vertical movement in guideway forming slots 68 and 68' in the back plate 50 and the mounting plate 20, respectively. The one link 65 is extended at the upper end and carries a cam roller 70 for engagement by an actuating cam track 71 (FIGURE 3) which opens the arms 55 and 55' at the proper time after the shell is cracked for dumping the egg contents. The opening cam track 71 is provided on the edge of a bracket plate, hereinafter referred to, which is located just beyond the cracking station and a closing cam rail 72 (FIGURE 10) is provided near the apex end of the machine. The pin 66 is positioned so that when moved to the position for fully opening the arms 55 and 55' it passes across its center relative to the pivot pins 64 and 64' and the arms 55 and 55' remain in open position. When the cam roller 70 engages the cam rail 72 (FIGURE 10) the arms 55 and 55' are moved to closed position and the latter are thereafter held closed by the torsion spring 61 until the assembly reaches the opening cam 71.

The holddown arm 54 has a curved rod 75 at its outer end which is adapted to rest on the top of an egg 12 when the latter is seated in the cradle 53, and to form therewith egg gripping or clamping jaw members. The arm 54 is mounted intermediate its ends on the end of a cross pin 76. The pivot pin 76 is journaled in a U-shaped bracket 77 which is mounted in outwardly opening relation on the back plate 50. The pivot pin 76 carries a torsion spring 78 which is connected to the arm 54 so as to normally hold the arm 54 in position for the end member 75 to engage and hold the egg 12 in the cradle 53. The arm 54 extends along the leading vertical side edge of the back plate 50 and projects through the conveyor 16 for engagement by cam rail 80 (FIGURE 3) which lifts the arm 54 to clear the egg as it is deposited on the cradle 53 at the infeed end of the machine. A cam rail 81 (FIGURE 11) at the apex end of the machine lifts arm 54 to permit discharge of the empty shells into a waste chute or trough 82 which is positioned adjacent the entrance to the housing for the washing apparatus 28. A flange portion 83 on bracket 77 forms a stop for limiting movement of the arm 54 toward the cradle 53.

The cradle 53 has associated cracking knives 84, 84' which are mounted on upwardly opening, U-shaped brackets 85, 85' connected to the brackets 58, 58' by pivot pins 86, 86' on which torsion springs 87, 87' are carried, the latter being connected with cracking knives 84, 84' so as to urge the same towards cracking position. Headed stop bolts 88, 88' are adjustably mounted in brackets 58, 58' outboard of the pivots 86, 86' so as to provide adjustable limit stops for the cracking knives 84, 84'. The cracking knives 84, 84' are extended at their ends 89, 89' inboard of the conveyor 16 so that the ends 89 and 89' will engage with the cam rail 90 (FIGURE 3) and pivot the knives 84 and 84' to a cocked position indicated in dotted lines in FIGURE 4, for subsequent release at the cracking station where they are snapped, by action of the torsion springs 87 and 87', into penetrating engagement with the shell of the egg 12 and crack the same. The cracking occurs as the edges are advanced to a cracking station, indicated at B in FIGURE 1, just beyond the feed conveyor 11.

As each assembly 15 advances to the cracking station B (FIGURE 1) the egg gripping arm 54 moves beneath holddown weights 91 and 92 (FIGURES 4 and 5) which are mounted on the outboard ends of the arms 93 and 94, respectively, of a U-shaped supporting bracket 95. The bracket 95 is mounted for outward and downward swinging movement by means of pivot pin 96 on a pair of spaced bearing ears 97, 97' which are secured on a cam plate and support bracket 98 extending from the main frame 17. The weights 91 and 92 which are supported at different elevations have tapered trailing ends and successively engage each arm 54 as the latter is lowered by descent of the cracking mechanism 18 just prior to the cracking operation in order to reduce the distance the contents must fall before reaching the separating mechanism 22 when the shell is opened for discharge of the contents after it is cracked.

The mechanism 22 for separating the whites or albumen from the yolks is mounted at the lower end of the assembly 15 in vertical alignment beneath the cradle 53, and comprises the yolk cup 23 and the bottom albumen collecting pan 24 which is of generally triangular, cross sectional shape in the transverse direction relative to the path of movement of the assembly 15. A bracket 100 of inverted U or V shape extends above the collecting pan 24 and carries at its upper end an upwardly opening, U-shaped bracket 101 in the spaced legs of which a pivot pin 102 is journaled and with its outboard end secured to the inboard wall of the yolk bowl 23. The yolk bowl 23 is in the form of a relatively shallow tray of semi-circular cross section having a curved bottom plate 103 partially closed at the ends by wall forming end plates 104 and 104' which taper downwardly and inwardly towards the center of the bowl and which are cut so as to provide a slot 105, 105' for drainage of the albumen from opposite ends of the bottom of the bowl. The edges of the bottom plate 103 which form the bottom edges of the slots 105, 105' are cut on a taper as indicated at 106 and 106' as to provide a relatively sharp edge for cutting off the albumen when it drains from the bowl. This arrangement which separates the albumen from the yolk by allowing albumen to flow out of the end slots 105, 105' at the bottom of the bowl results in a higher percentage of separation and is particularly advantageous when handling eggs with small yolks which do not fill the bowl so that a certain amount of albumen is frequently trapped in the bowl when the bowl is constructed so that the albumen is forced to drain over the top only. A Z-shaped cam rod 107 is secured to the outboard end wall 104 so that it is engaged by the cam bar 108 at a yolk dumping station, indicted at D in FIGURE 1, which is near the apex of the frame 17 so as to pivot the bowl 23 about the pivot pin 102 and dump the yolk into a chute 27 for discharge from the machine (FIGURE 10).

The separating mechanism 22 is pivotally mounted for swinging movement on the bottom chain plate 32 by means of a bale-like, U-shaped pivot link 115 having the ends of the legs thereof connected to the pivot pin 116 which is journaled in the downwardly extending, spaced legs of the bracket 100. The cross bar portion 117 of the pivot link 115 is adapted to seat in the bearing formation provided by the upturned bottom margin 118 of a flange member 119 depending from the outboard edge of a support bracket 120 which is mounted on the link plate 32. A U-shaped latch member 121 is pivoted on a pin 122 extending between bearing forming ears 123 on the outboard edge of the bracket member 120 so that the ends of the legs of the latch member 121 close the bearing groove formed by the lip 118 and lock the cross piece 117 in pivoted relation therein. The latch member 121 may be swung by manual engagement of the cross bar 124 so as to free the pivot link 115 for removal of the mechanism 22 when desired. An L-shaped arm 125 on the pivot link 115 provides a stop for the bracket 100 and limits the movement of the mechanism 22 about the pivot 116. The white accumulating pan 24 is provided with an outwardly extending pin 126 at its outboard edge which normally rides on the supporting rail 25 but which may be grasped by the operator at the inspection station, indicated at C in FIGURE 1, for manually pivoting the mechanism 22 about the two pivots 116 and 117 so as to cause the entire separating mechanism to swing free of the supporting rail 25 and drop to a depending vertical position below the conveyor 16 when it is found that a spoiled egg or a broken yolk has been deposited therein so as to dump the entire contents into one or the other of collecting trays, indicated at 127 and 127', which are positioned along the conveyor 16 for this purpose. Upon dumping the contents from the separating mechanism, the latter is free to drain until it reaches a point adjacent the apex end of the conveyor 17 where the mechanism is picked up by the guide rail 128 (FIGURES 1 and 2) and carried with other separating mechanisms through the washing apparatus 28.

Each cracking mechanism 18 is raised on the conveyor 16 to different elevations at various points as the assembly 15 travels in a path about the suporting frame 17. The mounting plate 20 carries a pin 130 extending inboard of the conveyor 16 with a cam roller 131 mounted on the inboard end thereof which is adapted to engage cam rails for raising and lowering the mechanism 18. At the egg infeed end of the conveyor 16 vertically spaced rails 132 and 133 which are mounted by suitable means on the inboard side of the conveyor 16 to form a track for receiving the cam roller 131 so as to hold the cracking mechanism 18 at the proper level to receive the eggs 12 from the conveyor 11 and thereafter to lower the mechanism 18 at the cracking station B so as to dump the egg contents, when the shell is opened, as close as possible to the separating mechanism 22. As the assembly 15 is advanced by conveyor 15 along the inspection and separating side of the machine, indicated at C in FIGURE 1, the roller 131 rides on the control rail 134 which is bent to zigzag pattern in the vertical direction so that the cracking mechanism 18 is alternately raised and lowered. The jiggling motion thus imparted to the mechanism serves to overcome the tendency of the albumen to cling to the shell portions and to shake the same loose as the mechanism advances.

The cradle members 56, 57 and 56', 57' are swung to closed position by the cam bar 72 (FIGURE 10) as each breaking head approaches the apex end of the frame 17 and the holddown finger 75 is raised by the cam rod 81 (FIGURE 11) so as to free the empty egg shell portions for removal into the chute 20. A plate 135 depending from a supporting bracket 136 is disposed in the path of the shell portions above the chute 82 so as to brush off the cradle 53 any shell portions which fail to fall from the cradle 53 when freed by movement of the holddown finger 75.

The washing apparatus 28 is arranged in a housing 137 extending along the back side of the machine and is provided with suitable fluid jets connected to a supply line for water or other cleaning fluid and, if desired, associated brushes arranged in a suitable manner, for example, as shown in Patents Nos. 2,818,096; 2,815,055 and 3,101,146, and operated to wash and clean both the cracking assembly 18 and the separating assembly 22 of each successive breaking head 15 as the heads are advanced through the housing 137.

While particular materials and specific details of construction are referred to in describing the form of the machine which is illustrated, it will be understood that other materials and equivalent structural details may be resorted to within the spirit of the invention.

I claim:
1. An egg breaking and contents separating machine comprising an endless traveling conveyor having breaking and separating heads mounted in spaced relation thereon for travel in a generally horizontal path, said breaking and separating heads each including a supporting frame having mounted thereon a breaking assembly and a contents separating assembly, said assemblies extending outboard of the conveyor and disposed in generally vertically aligned relation, said breaking assembly comprising egg supporting and gripping jaw members and cracking blades associated with the egg supporting jaw members, means to operate the blades to crack the shell of an egg held in said jaw members and means to swing said supporting jaw members apart so as to open the egg shell and permit the egg contents to be dumped by gravity into the associated contents separating assembly, said contents separating assembly comprising a yolk cup and an albumen receiving pan with said pan being disposed beneath the yolk cup and supporting said yolk cup, said yolk cup being mounted to turn about a horizontal axis extending normal to the plane of the outboard face of said supporting frame, said albumen receiving pan being pivotally mounted on said supporting frame so that it may swing downwardly about an axis extending generally parallel with the path of travel of said supporting frame to a contents dumping position, and means along said traveling conveyor to support said yolk cup and said pan in position to receive the yolk and albumen when said jaw members are swung apart and thereafter to permit said contents separating assembly to swing to a contents dumping position.

2. An egg breaking and contents separating machine as recited in claim 1, and said supporting frame constituting a vertically disposed link forming member of said traveling conveyor.

3. An egg breaking and contents separating machine as recited in claim 1, and said supporting frame having a support plate mounted for vertical sliding movement thereon, means for detachably mounting said breaking assembly on said support plate, and cam means for moving said support plate so as to reciprocate said breaking assembly in a vertical path.

4. An egg breaking and contents separating machine comprising an endless traveling conveyor having breaking and separating heads mounted in spaced relation thereon for travel in a generally horizontal path, said breaking and separating heads each including a supporting frame having mounted thereon a breaking assembly and a contents separating assembly, said assemblies extending outboard of the conveyor and disposed in generally vertically aligned relation, said breaking assembly comprising egg supporting and gripping jaw members and cracking blades associated with the egg supporting jaw members, means to operate the blades to crack the shell of an egg held in said jaw members and means to swing said supporting jaw members apart so as to open the egg shell and permit the egg contents to be dumped by gravity into the associated contents separating assembly, said contents separating assembly comprising a yolk cup and an albumen receiving pan disposed beneath the yolk cup, said contents separating assembly being pivotally mounted on said supporting frame so that it may swing downwardly to a contents dumping position, and means along said traveling conveyor to support said yolk cup and said pan in position to receive the yolk and albumen when said jaw members are swung apart and thereafter to permit said contents separating assembly to swing to a contents dumping position, and said supporting frame comprising spaced, generally vertical rod members, a support plate slidably mounted on said rod members, means mounting a breaking assembly on said support plate, a cam member on said support plate and co-operating cam bar means extending along said conveyor for controlling the vertical position of said support plate on said supporting frame.

5. An egg breaking and contents separating machine comprising an endless traveling conveyor having breaking and separating heads mounted in spaced relation thereon for travel in a generally horizontal path, said breaking and separating heads each including a supporting frame having mounted thereon a breaking assembly and a contents separating assembly, said assemblies extending outboard of the conveyor and disposed in generally vertically aligned relation, said breaking assembly comprising egg supporting and gripping jaw members and cracking blades associated with the egg supporting jaw members, means to operate the blades to crack the shell of an egg held in said jaw members and means to swing said supporting jaw members apart so as to open the egg shell and permit the egg contents to be dumped by gravity into the associated contents separating assembly, said contents separating assembly comprising a yolk cup and an albumen receiving pan disposed beneath the yolk cup, said contents separating assembly being pivotally mounted on said supporting frame so that it may swing downwardly to a contents dumping position, and means along said traveling conveyor to support said yolk cup and said pan in position to receive the yolk and albumen when said jaw members are swung apart and thereafter to permit said contents separating assembly to swing to a contents dumping position, and said breaking assembly comprising cradle forming bottom jaw members mounted at their inboard ends on a pair of brackets depending from the lower ends of link forming cross bars which are connected by a pivot pin, the pivot axis of which extends outboard of said conveyor and normal to the path of movement thereof, cam means for operating the link bars to move the jaw members toward and from each other, a pivoted clamping arm for cooperation with said bottom jaw members to clamp an egg therebetween, cam means for operating said clamping arm, said clamping arm having a curved egg engaging member for holding the egg on the cradle while it is cracked and the bottom jaw members are moved apart to open the egg and dump the egg contents.

6. An egg breaking and contents separating machine as recited in claim 5, and means for locking said link bars in either the open or closed position of said jaw members.

7. An egg breaking and contents separating machine as recited in claim 5, and weight forming members mounted along said conveyor for engaging said clamping arm while the egg is cracked.

8. An egg breaking and contents separating machine as recited in claim 5, and the cam means for operating said link bars and said clamping arm being operative after the egg is broken and the contents is dumped to move said jaw members toward each other and to raise said clamping arm so as to release the broken shell for discharge into a waste chute.

9. In an egg breaking and contents separating machine, a breaking head mounted on a traveling conveyor, said breaking head comprising a supporting frame disposed to travel in a vertical plane, an egg cracking assembly mounted on a support member for vertical reciprocating movement on said supporting frame which cracking assembly includes egg gripping members having associated cracking knives, means to operate the cracking knives and means to move the gripping members apart after the egg is cracked so as to separate the shell into two portions and dump the egg contents, an egg contents separating assembly mounted on said supporting frame below said egg cracking assembly, and means for raising and lowering said cracking assembly relative to the separating assembly while said assemblies are advanced by said conveyor.

10. In an egg breaking and contents separating machine as recited in claim 9, and said means for raising and lowering said cracking assembly being operative to lower the assembly when the egg contents is dumped and thereafter to provide for vertical reciprocating movement of said assembly.

11. In an egg breaking and contents separating machine as recited in claim 9, and said egg cracking assembly comprising a pair of pivotally mounted arms extending outward of the conveyor and having upwardly opening cradle formations for supporting an egg with its long axis generally parallel to the path of movement of the traveling conveyor and a pivotally mounted clamping arm extending outboard of the conveyor and having a curved end member positioned to engage the top of an egg and hold the same in the cradle formations during cracking and dumping of the egg contents.

12. In an egg breaking and contents separating machine as recited in claim 9, and said contents separating assembly comprising a bottom pan pivotally connected adjacent its inboard end to said supporting frame and detachably supported at its outboard end on a guide rail extending along said conveyor whereby said pan may be manually released so as to swing downwardly to a contents dumping position.

13. In an egg breaking and contents separating machine as recited in claim 9, and said contents separating assembly comprising a bottom pan and a yolk cup disposed above the same and constructed to receive and retain the yolk and allow the albumen to separate therefrom through openings at the bottom of the cup and drain into said bottom pan.

14. In an egg breaking and contents separating machine as recited in claim 13, and said yolk cup being mounted on a pivot, the axis of which extends normal to the axis of the pivotal connection between the pan and its supporting frame so as to permit the yolk cup to be rotated to dump its contents.

15. In an egg breaking and contents separating machine, a separating assembly positioned to receive the contents of an egg from a cracking apparatus, said separating assembly comprising an albumen collecting means and a yolk cup mounted above the same, said yolk cup opening upwardly so as to receive the yolk and portions of the albumen, and said yolk cup being in the form of a section of a cylinder with end walls having openings at the bottom thereof which provide passageways for the albumen to separate from the yolk and drain into the collecting means below.

16. In an egg breaking and contents separating machine as recited in claim 15, and said yolk cup having a bottom wall portions at opposite ends forming the bottom edges of said openings and said portions being formed with a knife-like edge to facilitate separation of the albumen from the yolk.

17. In an egg breaking and contents separating machine as recited in claim 15, and said yolk cup having a generally semi-circular cross section with oppositely disposed end walls which taper inwardly and downwardly and the bottom edge portions of said end walls being spaced from the bottom wall so as to form the passageways for the albument to drain into the collecting pan.

18. In an egg breaking and contents separating machine as recited in claim 15, and said yolk cup having a semi-cylindrical bottom wall with drainage openings at oppositely disposed ends thereof through which the albumen may escape and separate from the yolk.

19. In an egg breaking and contents separating machine, an egg gripping, cracking and dumping mechanism comprising a support member, separably mounted cradle forming bottom jaw members extending outboard of the support member and having cooperating top clamp means for holding an egg on said cradle members, cracking knives mounted to move against the shell of an egg supported on said cradle members so as to penetrate the shell and cooperating said cradle members to hold the cracked shell portions on said cradle members when said cradle members are moved apart to swing open the cracked shell portions and dump the egg contents, said cradle members being mounted to swing on a common axis extending outboard of said support member and offset above the transverse axis of the egg, means to move said cradle members apart, a contents separating mechanism mounted below said cradle members in position to receive the egg contents when the cradle members move apart after an egg is cracked, said separating mechanism comprising an upwardly opening pan member and a yolk cup mounted for cooperation with said pan member and in position above said pan member to receive the egg contents, and means to move the pan member and the yolk cup about axes normal to each other so as to separate the albumen from the yolk and to discharge the same separately.

20. An egg breaking and contents separating machine comprising an endless traveling conveyor having breaking and separating heads and means to support said heads in spaced relation thereon for travel in a generally horizontal path, said breaking and separating heads each including a supporting frame with a cracking and dumping assembly and a contents separating assembly mounted thereon, said assemblies extending outboard of the conveyor and disposed in generally vertically aligned relation, said cracking assembly comprising cradle forming egg supporting jaw members and an associated clamping jaw member, said jaw members having associated cracking blades with the blades being operable to crack the shell of an egg held in said jaw members and said cradle forming members being operable to swing apart so as to open the egg shell and permit the egg contents to be dumped by gravity into the associated contents separting assembly, said contents separating assembly comprising a yolk receiving cup and an albumen receiving pan disposed beneath the yolk cup, said yolk cup having means for retaining the yolk and permitting the albumen to separate therefrom and drain into said pan, said yolk cup being pivotally mounted on said pan and said pan being pivotally mounted on said supporting frame so that said yolk cup and said pan may be independently swung to a contents dumping position, means to support said yolk cup and said pan in position to receive the yolk and albumen when said jaw members are swung apart, means to swing said yolk cup to discharge the yolk and means to release said pan so as to permit said pan to swing downwardly to a position to discharge the albumen therefrom.

References Cited

UNITED STATES PATENTS

| | | | |
|---|---|---|---|
| 941,415 | 11/1909 | Heatherington et al. | 146—2 |
| 2,966,184 | 12/1960 | Willsey | 146—2 |
| 3,133,569 | 5/1964 | Shelton et al. | 146—2 |

W. GRAYDON ABERCROMBIE, Primary Examiner